: 3,417,950
Patented Dec. 24, 1968

**3,417,950
VIBRATION ISOLATOR**
Kenneth W. Johnson, 4113, Lakeshore Drive, Rte. 1,
Jamestown, Ohio 45335
Original application July 11, 1966, Ser. No. 564,351, now
Patent No. 3,337,167, dated Aug. 22, 1967. Divided and
this application July 21, 1967, Ser. No. 655,133
3 Claims. (Cl. 248—24)

ABSTRACT OF THE DISCLOSURE

A vibration isolator device having dome-shaped resilient spring elements in frictional rubbing interengagement and encased in a resilient rubber-like casing member for synergistically combining vibration-absorption action with frictional-engaging action when supporting an object.

---

The present invention relates to a vibration-isolating and friction gripping device for connecting an object to be supported to a supporting surface and constitutes a division of co-pending application Ser. No. 564,351 filed July 11, 1966, now Patent 3,337,167 issued Aug. 22, 1967, for Vibration Isolator which was a continuation-in-part of a prior application Ser. No. 402,587 filed Oct. 8, 1964, for Vibration Isolator, now U.S. Patent 3,288,405 issued Nov. 29, 1966, which prior application was a continuation-in-part of an earlier prior application Ser. No. 177,037 filed Mar. 2, 1962, for Vibration Isolator and Gripping Device, now abandoned.

A primary object of the invention is to provide an improved dome-shaped resilient element which when attached to an object or machine provides correct spring rates for strength at a desired loading point whereby vibration is absorbed or dissipated by the resilient element of this invention thus reducing the transmissability of vibration either to or from said object or machine. In addition, the resilient element of this invention, when subjected to varying load conditions, provides tenacious friction engagement with a supporting surface which restricts creeping or sliding of the supported object or machine.

A further object of the invention is to provide a device of the character set forth which is self contained.

Another object of the invention is to provide a device of the character described which will fit machines or objects of different sizes, weights and vibration characteristics, through the use of differently rated springs.

A further object of this invention is to provide a device of the character described which may be fitted directed to certain machines or other objects to be supported in order to provide a synergistic vibration-absorbent frictionally-engaging action whereby such machines or objetcs cause the device to deflect under load and thereby spread the resilient spring portions of the device and a surface on which the device may be supported.

Other objects of the invention are:
To reduce vibration transmitted to or from support structures; to reduce noise; to match spring strength to loadings at desired support points (conventional rubber and felt pads have constant initial spring rates over their entire areas); to provide "floating" mounting for business machines and devices; and to provide a device having long life (as compared with compressible rubber, conventional spring or felt pads).

Other objects of the invention will become apparent from the following description taken in connection with the accompanying drawings, in which.

Throughout the several views of the drawings, like reference numerals refer to like parts.

Figure 1:
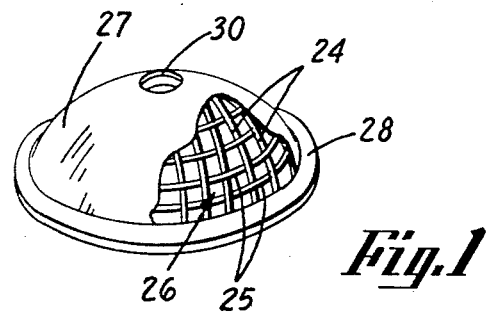
FIGURE 1 is a perspective view, partly broken away, of a vibration isolator device in accordance with the invention.
Figure 2:
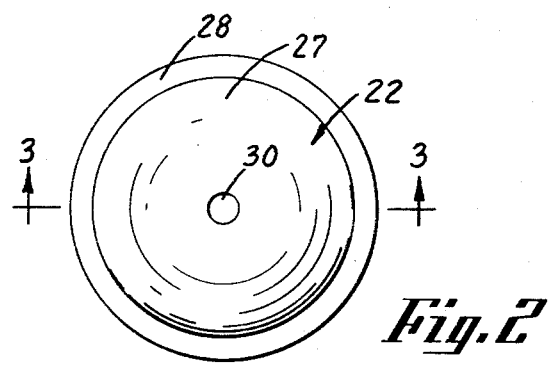
FIGURE 2 is an enlarged top plan view of the device of FIGURE 1.
Figure 3:
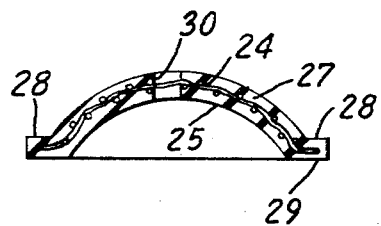
FIGURE 3 is a sectional view taken substantially along line 3—3 of FIGURE 2, as viewed in the direction indicated by the arrows.

As best shown in FIGURE 1 and 3, each dome-shaped isolator device 22 comprises a composite of a plurality of individual resilient membesr or elements 24, 25 con- of individual resilient members or elements 24, 25 connected together to provide a unitary member which functions in a spring-like manner. Elements 24, 25 in accord with this invention are of a yieldable metal material and preferably are formed of wire screen-like material with individual elements 24, 25 being formed into concavo-convex shape and angularly disposed relative to one another so that each of such individual elements constitutes in itself a spring and, because of the interweaving of such elements, each dome-shaped member 26 constitutes a plurality of springs in itself. Members 24, 25 are not ordinary coil elements of the known prior art but have been designed to provide a non-linear, so-called complex spring structure so that the ultimate vibration-absorption action and/or frictional engaging action of the invention may be attained. Member 26 and its elements 24, 25 are encased within casing 27 of rubber or rubber-like material having resiliency characteristics so that the composite of dome-shaped member 26 and casing 27 which is also dome-shaped constitutes a plurality of interconnected spring-like member. And in this connection, it is to be noted that elements 24 are extended into flange portion 28 of casing 27 so as to prevent rupture of casing 27 and additionally thereby provides a reinforced friction bearing surface.

In an ordinary spring made of metal wire, the spring rate or gradient is a function of the diameter of the spring wire. Similarly, the spring rate or gradient of a rubber spring-like member is a function of the relative hardness or softness of the rubber or rubber-like material. In accordance with the present invention, the co-action of elements 24, 25 and the rubber or rubber-like material of casing 27 provided in device 22 is such that the device constitutes a composite spring, the spring rate or gradient of which is a function of the diameter or diameters of elements 24, 25 the hardness of the material of casing 27, and the spring rate is additionally varied and/or modified because of the presence of casing material encompassed between the quadrilateral structure formed by adjacent pairs of interwoven elements 24, 25, which material must be compressed in one direction and elongated in a perpendicular direction in order to deflect the composite spring. As a vibration isolator, the structure of the composite device 22 also modifies the friction damping characteristics which result from the interweaving of elements 24, 25. Because of the interweaving of elements 24, 25, rubbing engagement occurs therebetween thus providing a frictional damping force when the composite dome-shaped member 26 is deflected. The presence of the material of casing 27 encompassed within the aforesaid quadrilateral structure provides a very substantially increased damping characteristic as compared to the relatively little amount of damping that is obtainable from the mere interweaving of elements 24, 25.

Additionally, it is to be noted that the frictional damping force is a function of the loading applied to the individual spring-like elements 24, 25 so that the friction damping force is a function not only of the spring rate or gradient of the spring-like elements that comprise member 26 but also the spring rate or gradient of the material of casing 27. Additionally, it is to be noted that since an increase in loading is required to cause an increase in deflection of the device, the friction damping force also increases as a function of the combined spring rate resulting from the co-action of elements 24, 25 and the material of casing 27.

An integral annular flange 28 having a flat bottom surface 29 surrounds the bottom of the dome-shaped casing member 27 and provides a frictional gripping surface, the grip of which is increased relative to a supporting surface upon which the gripping surface may be placed in accordance with an increase of pressure and/or load on the top of the device. A central opening 30 is provided at the apex of the device and extends through the material of casing 27 and composite spring member 26 to accommodate fastening means such as a rivet or threaded fastening means for securing the device to an object or a machine.

Thus, it will be seen that vibration isolator devices according to the present invention have relatively unlimited adaptability with respect to all types of machines or objects which require vibration-absorbing and frictionally-engaging action for most effective use. Moreover, machines and objects which utilize the vibration isolators of the present invention, cause such devices under loading conditions to exert a tenacious frictional engagement with a supporting surface by reason of the fact that the spring component of the device spreads under increasing loading conditions. Positive gripping engagement is insured because as the spring component is loaded by increasing loads, the tighter the frictional gripping engagement before. Additionally, the vibration isloators of the present invention differ from sponge rubber or felt pads which tend to become permanently compressed and depressed at their mounting points and lose their effectiveness whereas the device of the present invention retains its resiliency almost indefinitely.

While a particular embodiment has been shown and described, it will be obvious to those skilled in the art that various changes and modifications may be made without departing from the invention, and it is intended in the appended claims to cover all such changes and modifications that fall within the true spirit and scope of the invention.

What is claimed is:
1. A vibration isolator device for combining vibration-absorption action with frictional-gripping action while supportng an object comprising
 a plurality of spaced apart and interwoven resilient elements forming a dome-shaped composite spring member with said individual elements being in rubber interengagement to provide friction damping action durin deflection thereof,
 means for frictionally gripping a supporting surface and simultaneously modifying said damping action during deflection of said spring member including a member of resilient material encasing and forming a unitary structure with said spring member and having a substantially flat continuous peripheral frictional-gripping surface, and
 means including an opening in said unitary structure for connecting with an object to be supported.
2. Structure according to claim 1 wherein each of said interwoven resilient elements forming the composite spring member consists essentially of spring wire.
3. Structure according to claim 2 wherein said encasing material is rubber.

References Cited
UNITED STATES PATENTS

| 2,607,590 | 8/1952 | Wheaton | 248—188.8 XR |
| 2,670,914 | 3/1954 | Jones | 248—24 |
| 2,778,629 | 1/1957 | Johnson | 248—358.1 XR |

JOHN PETO, *Primary Examiner.*

U.S. Cl. X.R.
248—358